United States Patent [19]
Schulz

[11] Patent Number: 5,860,744
[45] Date of Patent: Jan. 19, 1999

[54] BAG OF A FLEXIBLE PACKING MATERIAL AND A METHOD OF MANUFACTURE THEREOF

[75] Inventor: Werner Schulz, Horsens, Denmark

[73] Assignee: Danisco A/S, Copenhagen, Denmark

[21] Appl. No.: 854,295

[22] PCT Filed: May 5, 1994

[86] PCT No.: PCT/DK94/00181

§ 371 Date: Feb. 13, 1996

§ 102(e) Date: Feb. 13, 1996

[87] PCT Pub. No.: WO94/25356

PCT Pub. Date: Nov. 10, 1994

Related U.S. Application Data

[63] Continuation of Ser. No. 545,678, Feb. 13, 1996, abandoned.

[30] Foreign Application Priority Data

May 5, 1993 [DK] Denmark .................................. 0512/93

[51] Int. Cl.$^6$ .................................................. B65D 33/24
[52] U.S. Cl. ................................ 383/210; 53/451; 383/84
[58] Field of Search ..................... 383/210, 84; 206/245, 206/260; 53/451

[56] References Cited

U.S. PATENT DOCUMENTS

| | | | |
|---|---|---|---|
| 3,412,771 | 11/1968 | Ralph | 383/210 |
| 3,552,638 | 1/1971 | Quackenbush | 383/210 |
| 3,596,828 | 8/1971 | Foster et al. | 206/260 |
| 3,655,503 | 4/1972 | Stanley et al. | 383/210 |
| 3,838,549 | 10/1974 | Pepmeier | 53/451 |
| 4,252,846 | 2/1981 | Romesberg et al. | 383/210 |
| 4,705,174 | 11/1987 | Goglio | 383/210 |
| 4,744,673 | 5/1988 | Nakamura | 383/38 |
| 4,785,933 | 11/1988 | Focke | 206/260 |
| 4,944,409 | 7/1990 | Busche et al. | 383/210 |
| 5,128,414 | 7/1992 | Hwo | 525/240 |
| 5,181,610 | 1/1993 | Quick et al. | 383/210 |

FOREIGN PATENT DOCUMENTS

| | | | |
|---|---|---|---|
| 60847 | 3/1971 | Australia . | |
| 45133 | 1/1986 | Australia . | |
| 693529 | 9/1964 | Canada | 206/260 |
| 109591 | 5/1968 | Denmark . | |
| 0 214 790 | 3/1987 | European Pat. Off. . | |
| 0 292 197 | 11/1988 | European Pat. Off. . | |
| 0 321 220 | 6/1989 | European Pat. Off. . | |
| 57-28777 | 2/1982 | Japan . | |
| 61-69453 | 4/1986 | Japan . | |
| 62-13338 | 1/1987 | Japan . | |
| 62-117741 | 5/1987 | Japan . | |
| 2-92629 | 4/1990 | Japan . | |
| 3-288642 | 12/1991 | Japan . | |

*Primary Examiner*—Stephen P. Garbe
*Attorney, Agent, or Firm*—Sterne, Kessler, Goldstein & Fox P.L.L.C.

[57] ABSTRACT

A bag made of a flexible packing material comprising a sheet of material having an inner face and an outer face and folded for the formation of a tube with an overlapping portion. In the overlapping portion, the packing material is sealed inner face to outer face by means of a lapseal. Along two side edge portions, the tube is welded inner face to outer face of the overlapping portion for obtaining a closed bag enclosing the packed product. The packing material provides a peel seal, when welded inner face to outer face and a strong seal when welded inner face to inner face. Seen relative to the bag, the packing material comprises an inner layer comprising polyethylene, and outer layer comprising a copolymer of polyethylene and polypropylene and a subjacent intermediate layer comprising polypropylene.

8 Claims, 2 Drawing Sheets

BAG OF A FLEXIBLE PACKING MATERIAL AND A METHOD OF MANUFACTURE THEREOF

This application is a continuation of application Ser. No. 08/545,678, filed Feb. 13, 1996, now abandoned.

TECHNICAL FIELD

The invention relates to a bag made of a flexible packing material by folding a sheet of material having an inner face and an outer face and comprising a pouch portion having a front wall and a back wall and a flap extending from the back wall and folded down onto the front wall about a folding line being essentially aligned with the upper free edge of the front wall, the inner face of the front wall being sealed to the inner face of the back wall at the side edge portions of the bag by means of the side edge seals, and the inner face of the flap being sealed to the outer face of the front wall by means of a longitudinal welding seam and by means of sealing seams at the side edge portions for obtaining a closed bag enclosing a packed product, seen relative to the bag said packing providing a peel seal when welded inner face to outer face, and a strong seal (fusion seal) when welded inner face to inner face.

BACKGROUND ART

DK-B-109 591 discloses a bag of the type stated in the introduction formed as a tobacco pouch having a pouch portion formed by folding a flexible packing material onto itself, and a flap folded down over the pouch portion. The inner face of the flap is welded or adhered peelably to the outer face of the pouch portion by means of a longitudinal weld, while the inner faces of the opposite walls of pouch portion and the flap are welded together in a non-peelable manner. This is obtained by using a packing material having a heat sealable first surface providing a fusion seal, when sealed onto itself, and a second surface providing a peel seal, when sealed onto the heat sealable surface of the packing material.

As examples of possible combinations of the two surfaces of the packing material polyethylene and vellum paper as well as polyethylene and aluminium foil are mentioned. When sealing polyethylene to vellum paper, a gas-proof packing cannot be obtained due to the structure and surface of the latter material. When sealing polyethylene to aluminium foil, an adhesion is obtained, whose strength is very difficult to control. In said publication it is therefore suggested to use an adhesion seal between the two materials of the mentioned combination of material.

The bags are made as single-bags, which are open at one side edge, i.e. only the longitudinal peel seal and one of the non-peelable seals are made, whereafter the prefabricated bags are filled with the desired product and the second strong side seal is provided. This method does not meet the requirements of today for a rational packing of products.

Peelable bags made on automatic form and fill machines are known. However, in these known bags the peelable seal is a side edge weld, i.e. the weld on which the product falls, when it is filled into the partly finished packing. This causes major problems, as the weld has to have such a strength when hot (hot tack strength) that it does not break, when the product falls thereon, but at same time it should be peelable when cold.

Finally, it should be mentioned that packing materials are known having a first outer layer of a copolymer of a polyethylene and polypropylene and a second outer layer of a polyethylene-containing polymer.

DISCLOSURE OF THE INVENTION

The object of the present invention is to provide a bag of the type stated in the introduction satisfying the demands of today for rational packing of products in a gas- or vacuum-proof, peelable bag.

The bag according to the invention is characterised in that seen relative to the bag the packing material comprises an inner layer comprising polyethylene (PE), an outer layer comprising a copolymer of polyethylene (PE) and polypropylene (PP) and a subjacent intermediate layer comprising polypropylene (PP).

By using a polymer-containing polyethylene in both the inner and the outer layer, in addition to obtaining a gas-proof strong seal when welding inner face to inner face, i.e. the PE-containing layer is welded onto itself, it is possible when welding inner face to outer face to provide a gas-proof seal and to control the strength of the seal, i.e. the peel strength, very accurately. On the whole, a gas-proof or vacuum proof packing is thus obtained, said packing being sealed by means of a peel seal, whose properties can be controlled very accurately. These advantageous properties have made it possible to manufacture the bag in a rational manner on a vertical bag form, fill and seal machine, which has not been possible previously due to the problems of controlling the quality of the welding. It is thus an essential feature of the bag according to the invention that the side edge weldings, which are heavily stressed, when the product falls thereon during filling, are fusion seals having sufficient strength when hot (hot tack strength) to resist said stresses. This in constrast to known peel seal bags, wherein the side edge welds are peelable.

According to the invention, the inner layer may be a copolymer of PE and PP differing from the copolymer in the outer layer.

Moreover, according to the invention, the composition of the inner and outer layer may be selected so that by welding said layers together a peel strength of between 100 and 800 g/20 mm, preferably between 200 and 500 g/20 mm, is obtained.

Furthermore, according to the invention, the peel strength between the outer layer and the intermediate layer may be between 100 to 800 g/20 mm, preferably 200 to 500 g/20 mm. In this embodiment the peel effect is between the outer layer and the intermediate layer, whereby it is possible to utilize such a composition of the outer layer and the inner layer that a stronger weld therebetween is obtained, such as a strong seal (fusion seal). This is advantageous in certain situations in order to accurately control the quality of the weld.

The invention furthermore relates to a method of manufacturing a filled, flexible bag comprising a pouch portion having a front wall and a back wall and a flap extending from the back wall and folded down onto the front wall about a folding line being essentially aligned with the upper free edge of the front wall, said bag being sealed by means of a longittudinal peelable seal in the overlapping portion between the flap and the front wall and being sealed by means of non-peelable seals along opposite side portions.

The method according to the invention is characterised by
  forming a tube of a flexible sheet of material about a filling tube of a bag form, fill and seal machine, opposite sheet edges being arranged in an overlapping manner for the formation of a front wall, a back wall and a flap,
  providing a longitudinal weld between the overlapping sheet portions, providing a transverse weld in the entire width of the tube, filling the product to be packed into the tube, providing a transverse weld in the entire width of the tube above the filled in product, and separating the filled bag from the tube, said sheet of material comprising an inner layer comprising PE, an outer layer comprising a copolymer of PE and PP and a subjacent intermediate layer comprising PP, and whereby the welding of the inner face to the outer face provides a peel seal, while the welding of the inner face to the inner face provides a strong seal (fusion seal).

BRIEF DESCRIPTION OF THE DRAWINGS

The invention is described in greater detail in the following with reference to the particularly preferred embodiments and accompanying drawings, in which.

DESCRIPTION OF THE PREFERRED EMBODIMENTS OF THE INVENTION

Figures 1, 2:
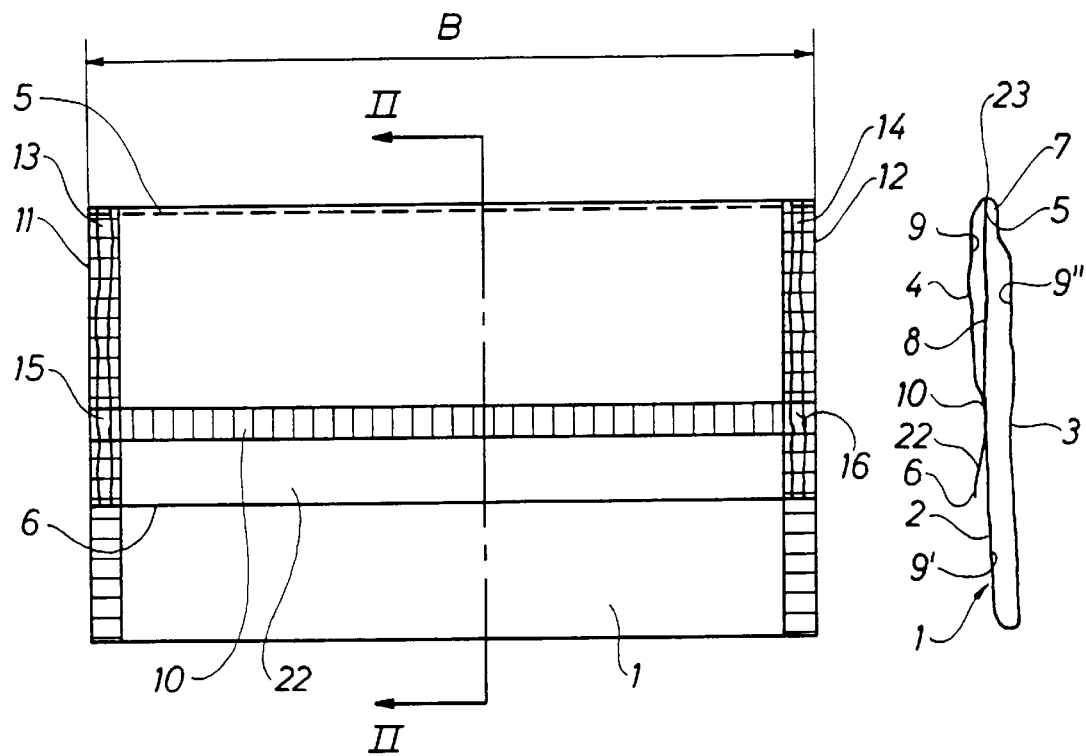
FIG. 1 is a diagrammatic front view of a bag according to the invention.
FIG. 2 is a diagrammatic sectional view along the line II—II in FIG. 1.
Figure 3:
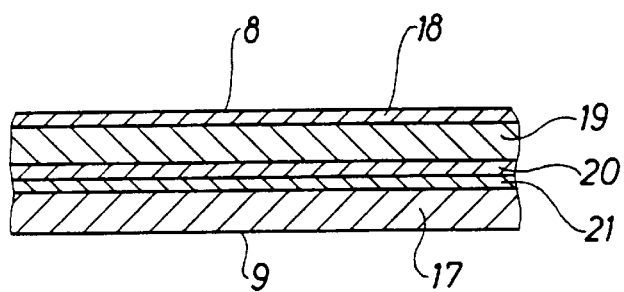
FIG. 3 is a diagrammatic cross-sectional view through an example of a packing material for the bag according to the invention.

The embodiment of the bag according to the invention shown in FIGS. 1 to 3 has the form of a pouch with a pouch portion 1 formed by a front wall 2 and a back wall 3 of essentially the same height and a flap 4 extending in an overlapping manner down onto the front wall 2, the folding line 23 between the flap 4 and the back wall 3 being essentially aligned with the free edge 5 of the front wall 2. The pouch is formed by bringing a first edge 5 of a sheet of material to a position opposite the sheet of material and subsequently bringing an opposite second edge 6 of the sheet of material into an overlapping position in relation to the first edge 5. The first edge thus forms the opening 7 of the pouch portion 1.

Between the outer face 8 of the front wall 2 and the inner face 9 of the flap a longitudinal seal 10 is provided extending in a through-going manner between two side edges 11, 12 of the bag. At each side edge portion a side edge seal 13,14 is provided between the inner face 9' of the front wall 2, and the inner face 9" of the back wall 3. Correspondingly, in the area of each side edge 11, 12 a sealing area 15,16 is provided between the inner face 9 of the flap 4 and the outer face 8 of the front wall 2.

As shown in FIG. 3, the flexible packing material used for the bag comprises a first outer layer 17 containing polyethylene (PE), preferably a coppolymer of polyethylene and polypropylene, and forming the inner faces 9',9" of the bag. The packing material further comprises a second outer layer 18 forming the outer faces 8 of the bag, and being a coppolymer of PE and PP, preferably a copolymer differing from the copolymer of the first outer layer 17. The second outer layer 18 is laminated by co-extrusion to an intermediate layer 19 of polypropylene (PP). Between the intermediate layer 19 of PP and the first outer layer 17 a layer 20 of copolymer of PP and PE is arranged as well as a binder layer 21 ajacent the first outer layer 17.

In this connection it should be mentioned that between the intermediate layer 19 and the first outer layer 17 an optional number of various laminate layer may be provided, depending on which properties the packing material are to possess.

Due to the structure of the packing material a strong seal (fusion seal) will be provided in the areas, where the first outer layer 17 is welded onto itself, i.e. a welding inner face 9 to inner face 9, as is the case for the side edge seals 13,14, while a peel seal is provided in the areas, where the first outer layer 17 is welded to the second outer layer 18, i.e. a welding inner face 9 to outer face 8, as is the case for the longitudinal seal 10 and the sealing areas 15, 16 over the side edge seals 13,14.

The peelable seals 15,16,10 preferably have a peel strength of 100 to 800 g/20 mm, and most perferred between 200 and 500 g/20 mm. This may either be obtained by the peel strength of the welding between the inner face 9 and outer face 8 being within said range, or by providing a stronger seal or a fusion seal between said faces 8,9, however, the adhesion between the second outer layer 18 and the intermediate layer 19 being of a strength corresponding to a peel strength within said range. As a result, the peelability is provided by a delamination of the layers 18,19, when the bag is opened by pulling in the free end portion 22 of the flap 4.

Figure 4:
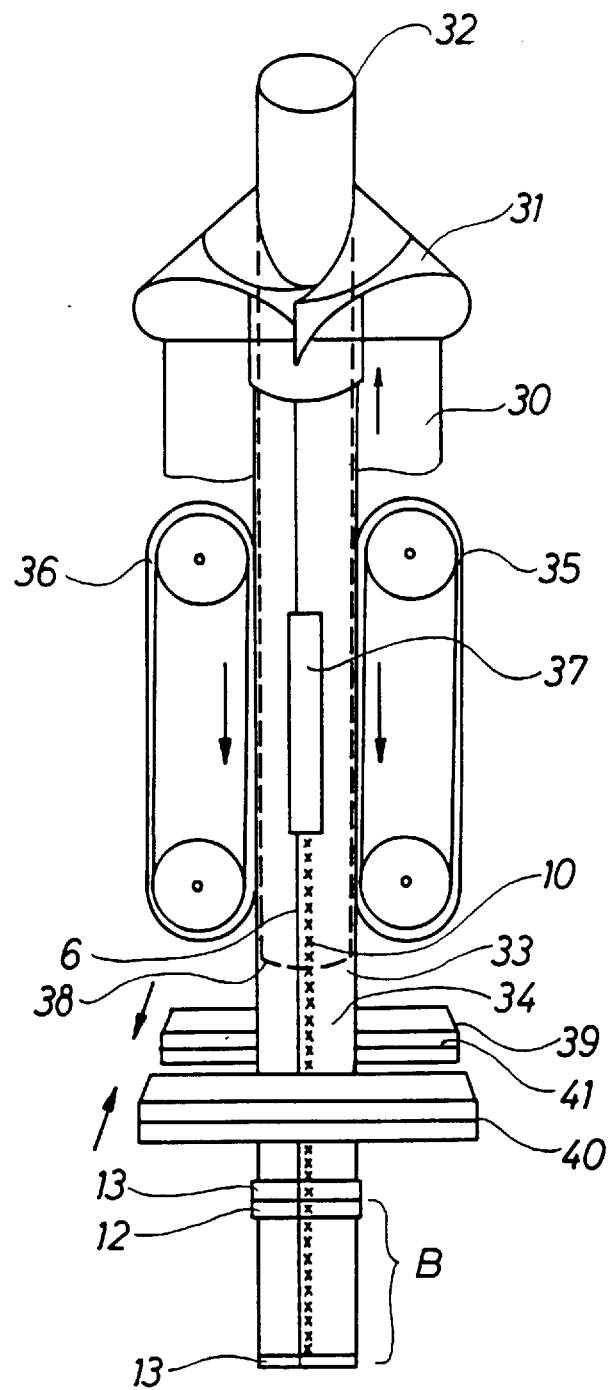
FIG. 4 is a diagrammatic illustration of the method according to the invention for manufacturing a bag.

FIG. 4 diagrammatically illustrates the method of manufacturing the bag shown in FIGS. 1 to 3. A continuous sheet of the flexible packing material 30 from a row of material (not shown) is guided over a forming shoulder 31 and about a combined filling and forming tube 32 and thereby formed into a tube 33, the side edges 5,6 thereof overlapping each other in an overlapping portion 34. The sheet material is advanced by means of two opposite conveyor belts 35 pressing the formed tube 33 against the forming tube 32. Furthermore, the forming tube 32 serves as a support for a longitudinal sealing tool 37 arranged between the two conveyor belts 35,36 and intended to form the longitudinal seal 10 of the bag. Below the conveyor belts 35,36 and the lower end 38 of the forming tube 31, two transverse sealing tools 39, 40 are arranged opposite each other and may be moved in the direction towards each other and away from each other. Moreover, in the transverse sealing tools 39,40 a cutting knife 41 is arranged for cutting the foil tube 33. The transverse sealing tools 39,40 form the side edge seals 13,14 of the bag and the superjacent sealing areas 15,16 between the flap 4 and the front wall 2, while the knife 41 separates a finished bag containing the packed product from the tube 33.

The manufacturing and filling of the a bag is carried out as follows.

A length of the sheet of material corresponding to the width B of a finished packing is advanced intermittently by means of the conveyor belts 35,36 for the formation of the tube 33.

The longitudinal welding tool 37 is then brought into engagement with the packing material for the formation of the longitudinal seal 10 of the packing, and the transverse welding tools 39,40 are moved towards each other to form the side edge seal 12 of a previously formed bag, and the side edge seal 13 of the bag being formed. At the same time, the knife 41 separates the two bags from each other. In this connection it should be mentioned that the situation illustrated in FIG. 4, whereby two bags of the tube are connected below the transverse sealing tools 39, 40 and the knife 41, would never occur in practice, as the lowermost bag would have been separated from the rest of the tube in area of the knife 41. The illustrated situation merely serves as an illustration of the filling operation.

The transverse sealing tools 39, 40 are then moved away from each other, and the longitudinal sealing tool 37 is moved away from its welding position.

The tube length B is subsequently advanced by means of the conveyor belts 35,36 and the desired product is filled into the tube 33 through the forming and filling tube 31, whereafter the transverse sealing tools 39,40 are moved towards each other once more, and the longitudinal sealing tool 37 is moved towards the forming tube 33 as described above. As a result, a side edge seal 12 is formed above the filled-in product and the bag is completed.

When the transverse welding tools 39,40 are moved away from each other again, the formed bag will fall down, as it has been separated from the rest of the tube by means of the knife 41.

The invention may be modified in many ways without thereby deviating from the scope of the invention. Thus, the advancement of the formed tube 33 be may carried out by moving the transverse welding tools 39,40 a distance B corresponding to the width of the bag in connection with each welding operation instead of using the separate conveyor belts.

Finally, it should be mentioned that the flap 4 may extend any given length down onto the front wall 2, provided is has sufficient length to allow for the peelable seal 10 and a gripping portion 22 to be grasped by the user when the peelable seal 10 is to be peeled and the bag opened for removal of the product packed therein.

I claim:

1. A bag made of a flexible packing material by folding a sheet of material having an inner face and an outer face and comprising a pouch portion having a front wall and a back wall and a flap extending from the back wall and folded down onto the front wall about a folding line being essentially aligned with the upper free edge of the front wall, the inner face of the front wall being sealed to the inner face of the back wall at the side edge portions of the bag by means of side edge seals, and the inner face of the flap being sealed to the outer face of the front wall by means of a longitudinal welding seam and by means of sealing seams at the side edge portions for obtaining a closed bag enclosing a packed product, said packing material providing a peel seal when welded inner face to outer face, and a strong seal when welded inner face to inner face, wherein seen relative to the bag said packing material includes an inner layer formed of polyethylene (PE), an outer layer formed of a copolymer of polyethylene (PE) and polypropylene (PP) and a subjacent intermediate layer formed of polypropylene (PP), said outer layer and said subjacent intermediate layer being formed by coextrusion, the peel strength between the outer layer and the intermediate layer being between 100–800 g/20 mm.

2. A bag as in claim 1, wherein said inner layer is formed of a copolymer of PE and PP different from the copolymer in said outer layer.

3. A bag as in claim 1, wherein the composition of said inner and outer layers, has been selected so that by welding said layers together, a peel strength of between approximately 200 and 500 g/20 mm, is obtained.

4. A bag as in claim 1, wherein the peel strength between said outer layer and said intermediate layer is between approximately 200 to 500 g/20 mm.

5. A method of manufacturing a filled, flexible bag including a pouch portion having a front wall and a back wall and a flap extending from the back wall and folded down onto the front wall about a folding line being essentially aligned with the upper free edge of the front wall, said bag being sealed by means of a longitudinal peelable seal in the overlapping portion between the flap and the front wall, and being sealed by means of non-peelable seals along opposite side portions, wherein said method comprises the steps of:

forming a tube of a flexible sheet of material about a filling tube of a bag form, fill and seal machine, opposite sheet edges being arranged in an overlapping manner for the formation of a front wall, a back wall and a flap, providing a longitudinal weld between said overlapping sheet portions, providing a transverse weld in the entire width of said tube, filling said tube with a product to be packed, providing a transverse weld in the entire width of said tube above the filled in product, and separating the filled bag from said tube, said sheet of material including an inner layer formed of PE, an outer layer formed of a copolymer of PE and PP and a subjacent intermediate layer formed of PP, and whereby the welding of the inner face to the outer face provides a peel seal, while the welding of the inner face to the inner face provides a strong seal, said outer layer and said subjacent intermediate layer being formed by coextrusion, the peel strength between the outer layer and the intermediate layer being between 100–800 g/20 mm.

6. A method as in claim 5, wherein the inner layer is formed of a copolymer of PE and PP different from the copolymer of said outer layer.

7. A method as in claim 5, wherein the composition of said inner and outer layers have been selected so that by welding said layers together a peel strength of between approximately 100 and 800 g/20 mm, and preferably between approximately 200 and 500 g/20 mm, is obtained.

8. A method as in claim 5, characterized in that the peel strength between said outer layer and said intermediate layer is between approximately 200 to 500 g/20 mm.

* * * * *